(12) United States Patent
Guzman-Verri et al.

(10) Patent No.: US 10,184,697 B2
(45) Date of Patent: Jan. 22, 2019

(54) DEVICE FOR COOLING FLUID, METHOD FOR COOLING FLUID

(71) Applicants: Gian G. Guzman-Verri, Westmont, IL (US); Peter B. Littlewood, Chicago, IL (US)

(72) Inventors: Gian G. Guzman-Verri, Westmont, IL (US); Peter B. Littlewood, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 119 days.

(21) Appl. No.: 15/257,240

(22) Filed: Sep. 6, 2016

(65) Prior Publication Data
US 2017/0082324 A1     Mar. 23, 2017

Related U.S. Application Data

(60) Provisional application No. 62/220,456, filed on Sep. 18, 2015.

(51) Int. Cl.
F25B 21/00          (2006.01)

(52) U.S. Cl.
CPC ........ *F25B 21/00* (2013.01); *F25B 2321/001* (2013.01); *Y02B 30/66* (2013.01)

(58) Field of Classification Search
CPC ....... F25B 21/00; F25B 2321/00; Y02B 30/66
See application file for complete search history.

(56) References Cited

U.S. PATENT DOCUMENTS

| 3,436,924 A | 4/1969 | Lawless |
| 3,638,440 A | 1/1972 | Lawless |
| 4,757,688 A | 7/1988 | Basiulis et al. |
| 2004/0093877 A1* | 5/2004 | Wada ...................... F25B 21/00 62/114 |
| 2016/0377328 A1* | 12/2016 | Hurbi ...................... F25B 21/00 62/3.1 |

(Continued)

FOREIGN PATENT DOCUMENTS

WO   WO2006056809   6/2006

OTHER PUBLICATIONS

R. Chukka et al., An electrocaloric device demonstrator for solid-state cooling, Europhysics Letters, 103, Sep. 13, 2013.

(Continued)

*Primary Examiner* — Brian M King
(74) *Attorney, Agent, or Firm* — Cherskov Flaynik & Gurda, LLC

(57) ABSTRACT

The invention provides a method for cooling fluid having the steps of supplying a fluid at a first temperature T1, raising the temperature of the fluid to a second temperature T2 through contact with an electric field, contacting the fluid with a heat exchanger to decrease its temperature to a third temperature T3, removing the electric field to decrease the temperature of the fluid to a fourth temperature T4, and applying a heat load to the fluid to increase the temperature of the fluid to T1. Also provided is a system for cooling fluid having a closed loop having a first region subject to an electric field, a second region in contact with a heat exchanger, a third region remote from the electric field, and a fourth region contacting a heat load.

9 Claims, 2 Drawing Sheets

(56) References Cited

U.S. PATENT DOCUMENTS

2017/0268805 A1* 9/2017 Radcliff ................. F25B 21/00

OTHER PUBLICATIONS

H. Gu et al., A chip scale electrocaloric effect based cooling device, Applied Physics Letters, 102, Mar. 28, 2013.
Y. Jia et al., A solid-state refrigerator based on the electrocaloric effect, Applied Physics Letters, 100, Jun. 12, 2012.
S. Kar-Narayan et al., Direct and indirect electrocaloric measurements using multilayer capacitors, 43, Jan. 8, 2010.
U. Plaznik et al., Bulk relaxor ferroelectric ceramics as a working body for an electrocaloric cooling device, Applied Phyiscs Letters, 106, Jan. 30, 2015.
Y. Sinyavsky et al., Experimental Testing of Electrocaloric Cooling With Transparent Ferroelectric Ceramic as Working Body, Ferroelectrics, vol. 131, 1992.

* cited by examiner

DEVICE FOR COOLING FLUID, METHOD FOR COOLING FLUID

PRIORITY CLAIM

This Utility Patent Application Claims priority benefit as a Non-Provisional Application of Provisional Patent Application No. 62/220,456, filed on Sep. 18, 2015.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

The present invention relates to devices and methods for cooling, and more particularly, the present invention relates to a device and method for cooling substances using electric fields.

2. Background of the Invention

Thermoelectric methods for cooling (such as Peltier coolers) prove inefficient. Standard methods used in refrigeration and air conditioning systems are based on vapor compression of Freon gases or chlorofluorocarbons and hydrochlorofluorocarbons. These refrigerants pose serious risks to public health and the environment. These systems are also bulky and therefore cumbersome.

As electronics become more sophisticated, alternative methods for cooling will be required. For example, as transistor densities increase, processors consume more power and generate more heat.

Research continues for substances which can undergo large thermal changes as a response to external stimuli. Research is also ongoing to develop devices and methods for utilizing such stimuli as electric fields, to generate cooled substances more efficiently than state of the art systems.

Cooling methods and prototypes driven by electric fields and based on solid-state refrigerants operate on the electrocaloric effect (ECE). The ECE is a phenomenon in which a material shows a reversible temperature change under an applied electric field. The ECE is the result of entropy variations with polarization, e.g., isothermal polarization of a ferroelectric reduces its entropy while depolarization increases it. Thermal changes are largest in these solid ferroelectric materials near their polar-to-non-polar change points. The application of an electric field induces a polarization in a ferroelectric, which in turn heats it up because of the laws of thermodynamics. But no physical phase change occurs in these systems inasmuch as they operate near the solid-to-solid phase transformation temperatures of the ferroelectric. In summary of this point, solely solid state materials are acted upon by electric fields and remain as solids.

But these systems have drawbacks. Ferroelectrics, which are materials that exhibit spontaneous reversible polarization, exhibit caloric effects that are only a few milliKelvin per kV/cm, with the effect limited by their breakdown voltages. The effect can be enhanced somewhat by using ferroelectric thin films, however, these still have inadequate cooling power. Chip scale electrocaloric oscillatory refrigeration devices using solid state regenerators display a 6 K temperature span at near room temperatures (e.g. 10° C. to 40° C.). Specifically, the latent heats of solid-solid transformation in ferroelectrics is about 0.1 to 42 kJ/kg.

Magnetically cooled systems require large magnetic fields to be useful. Such fields are hard to generate and sustain. Also, the required magnets comprise expensive rare earth elements.

A need exists in the art for a device and method for efficiently cooling substances in room temperature environs when subjected to external stimuli. The substance should be environmentally friendly in that it should not be toxic to users, the ozone layer, or fauna. The system and method should impart large temperature changes and therefore high cooling power. The system and method should be safe and relatively inexpensive.

SUMMARY OF INVENTION

An object of the invention is to provide a method and device for efficiently cooling substances and that overcomes the drawbacks of the prior art.

Another object of the invention is to provide a device and method for heating and cooling a substance. A feature of the invention is the use of electric fields to cool or heat a substance in room temperature ambient conditions. An advantage of the invention is that phase change of the substance is induced by applying electric fields, which are easy and inexpensive to generate compared to magnetic fields required in other type of cooling methods based on magnetic materials.

Yet another object of the present invention is to provide a cooling method and device utilizing fluidized solid substances which exhibit large caloric changes given external stimuli. A feature of the invention is that the substances are ionic or polar fluids and maintained at or near their liquid-to-solid phase transformation temperatures to provide thermal responses that are largest near room temperature. An advantage of the invention is that it is energetically efficient inasmuch as the substances are constantly fluidized, therefore remaining in a pumpable phase throughout the entire cooling and heating cycle. Also, the substances are environmentally friendly.

Still another object of the present invention is to provide a system and method for cooling using electrofreezing near room temperatures. A feature of the invention is subjecting ionic and or polar fluids to electric fields near the liquid-to-solid transformation temperatures of the fluids. An advantage of the invention is that the heat released (absorbed) by the fluids when it freezes (melts) is significantly higher than that of solid-state refrigerants. As such, relatively large thermal changes (as large as 80 K) occur with these ionic and or polar fluids given small energy inputs, largely due to the latent heat characteristics of the fluids utilized.

Briefly, the invention provides a method for cooling fluid, the method comprising supplying an electrically conductive fluid, wherein the fluid is at a first temperature T1; subjecting the fluid to an electric field for a time and at a voltage sufficient to raise the temperature of the fluid to a second temperature T2; reducing the temperature of the fluid to a third temperature T3; removing the fluid from the electric field under adiabatic conditions to cause the fluid to decrease to a fourth temperature T4; and placing a heat load on the fluid to increase the temperature of the fluid to the first temperature T1.

Also provided is a system for cooling fluid, the system comprising a closed loop adapted to receive an electrically conductive fluid, wherein the fluid is at a first temperature, T1; an electric field in a close spatial relationship to a first region of the closed loop, said electric field subjecting the fluid to a current so as to raise the temperature of the fluid to a second temperature T2; a heat exchanger in thermal contact to a second region of the closed loop, wherein said second region is contiguous with the first region, said heat exchanger maintained at a temperature to cause the fluid to decrease in temperature from T2 to T3; a third region of the closed loop, wherein said third region is remote from the electric field to facilitate removal of the fluid from the electric field under adiabatic conditions, to cause the temperature of the fluid to crease from T3 to a fourth temperature T4; and a heat load thermally contacting a fourth region of the closed loop, wherein said fourth region is contiguous with the third region, said heat load adapted to increase the temperature of the fluid from T4 to the first temperature T1.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

A refrigerator and cooling method employing ionic/polar fluid refrigerants is provided. An electric field is applied to the refrigerant confined to a closed cycle loop and heat is extracted from it to induce electrofreezing, thereby forming a liquid-solid mixture (ionic/dipolar slush). Thereafter, the electric field is removed under adiabatic conditions, resulting in the cooling of the refrigerant. This electrofreezing occurs at or near room temperature conditions, e.g., between approximately 0° C. and approximately 40° C.

In an embodiment of the invention, none of the refrigeration substances are gases, rather the refrigerants are maintained in liquid and or liquid/semisolid (e.g. slush) phases at or near room temperatures. Therefore, the system is essentially devoid of the need for vacuums or very low pressure requirements.

The invention subjects bulk quantities of high latent heat refrigerant fluids to electric fields to provide efficient cooling in room temperature situations. The inventors estimate that the temperature changes provided by the invented system and method are an order of magnitude higher than solid state refrigerants (e.g. $BaTiO_3$). These temperature changes will range from a few tens of Kelvin to up to approximately 100 K. More typically, temperature swings enabled by the method and system can be as much as 80 K, at least 10 K, preferably between about 10 and 80 K, and most preferably between 20 and 60 K. Fluids with such large caloric effects can be utilized as both the refrigerant and heat exchange fluids, therefore leading to new cooling cycles with simpler structures.

Figure 1:
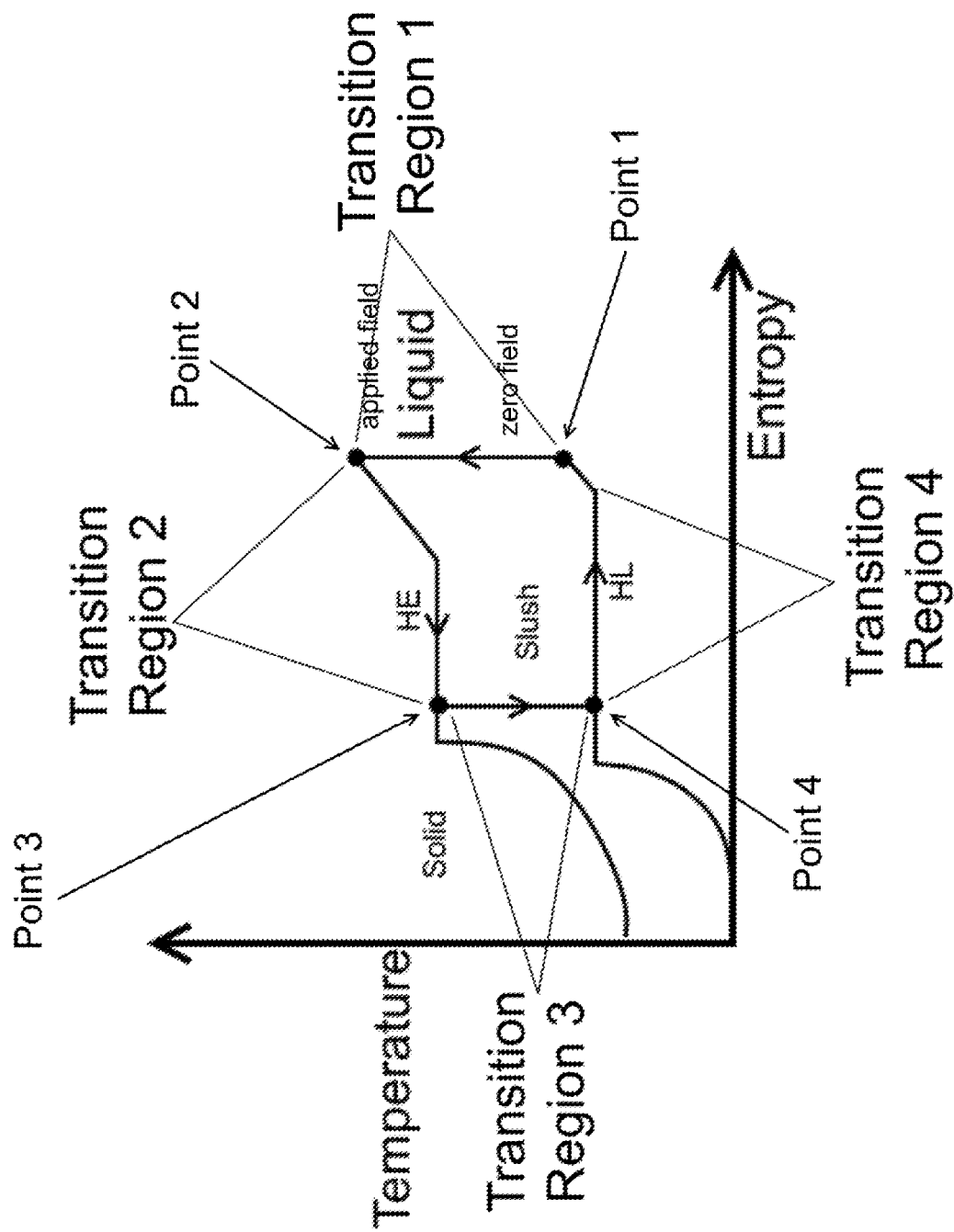
FIG. 1 is a diagram of the thermodynamic cycle of the invented system and method, in accordance of features of the present invention.

FIG. 1 provides an entropy/temperature flow diagram of the invented system and method. FIG. 1 exhibits a four transition region cooling process. Points 1, 2, 3, and 4 are at temperatures T1, T2, T3 and T4 respectively, and are set so that T2>T3>T1>T4, wherein the symbol ">" takes on its common meaning of "greater than."

A single cycle is described as follows: From point 1 to 2, and within Transition Region 1, fluid flows into a capacitor or some other means for generating electric fields. The applied electric field causes charged, or ionic or polar moieties (e.g. molecules) within the fluid to align, keeping entropy constant and therefore increasing its temperature from T1 to T2.

Transition Region 2, defining the path from point 2 to point 3, comprises the fluid flowing into a heat exchanger device "HE" in the figure (e.g., a condenser). The exchanger causes heat to be removed from the fluid while the fluid is being subjected to the electric field. This results in the temperature of the fluid decreasing from T2 to T3. This causes the fluid to begin a phase change from liquid to solid (e.g. forming slush). The phase change is not complete however. Rather, the running substance attains a fluidized solid at the coldest point of the process so as to facilitate pumping of the running substance through the system. Despite the ongoing phase change, the temperature T3 changes very little, if at all, due to the high latent heat characteristics of the fluid.

As the fluid travels along Transition Region 3 from point 3 to point 4 in the cycle, it flows out of the condenser. Also, the electric field is removed under adiabatic conditions in this region of the cycle such that the fluid experiences a further decrease in temperature to T4, which is the lowest temperature the fluid attains in the thermodynamic cycle. Since T4 is cooler than the starting temperature T1, overall cooling of the fluid has occurred. At this point in the cycle, the fluid contains the most slush of any region in the system loop. In an embodiment of the system, at this point, all of the fluid may be slush.

In traversing the cycle from point 4 to point 1, the fluid is subjected to a heat load "HL" in the figure (such as a melter) such that all of the slush within the fluid is converted back to liquid. In many instances, the fluid at T4 is a solid, or nearly a solid such that it absorbs heat without experiencing an increase in temperature off of Step 4 even during initial phase changes. At point T4 in the cycle, the running substance is more than 0 percent solid and less than 100 percent solid. Typically, the running substance is between about 5 percent solid (e.g., slush) and 90 percent solid. Preferably, the running substance is between about 20 percent solid and 70 percent solid, and most preferably the running substance is between about 40 percent solid and about 60 percent solid. In embodiments applied to microfluidics, viscosities of the running substance need to be relatively higher than in other applications, but need to be no higher than approximately 1.8 centipoise (cP) which is approximately the viscosity of water at 0° C.

Ultimately, the fluid's temperature increases to T1, as shown by the upward extending slope in the lower right quadrant of FIG. 1.

Figure 2:
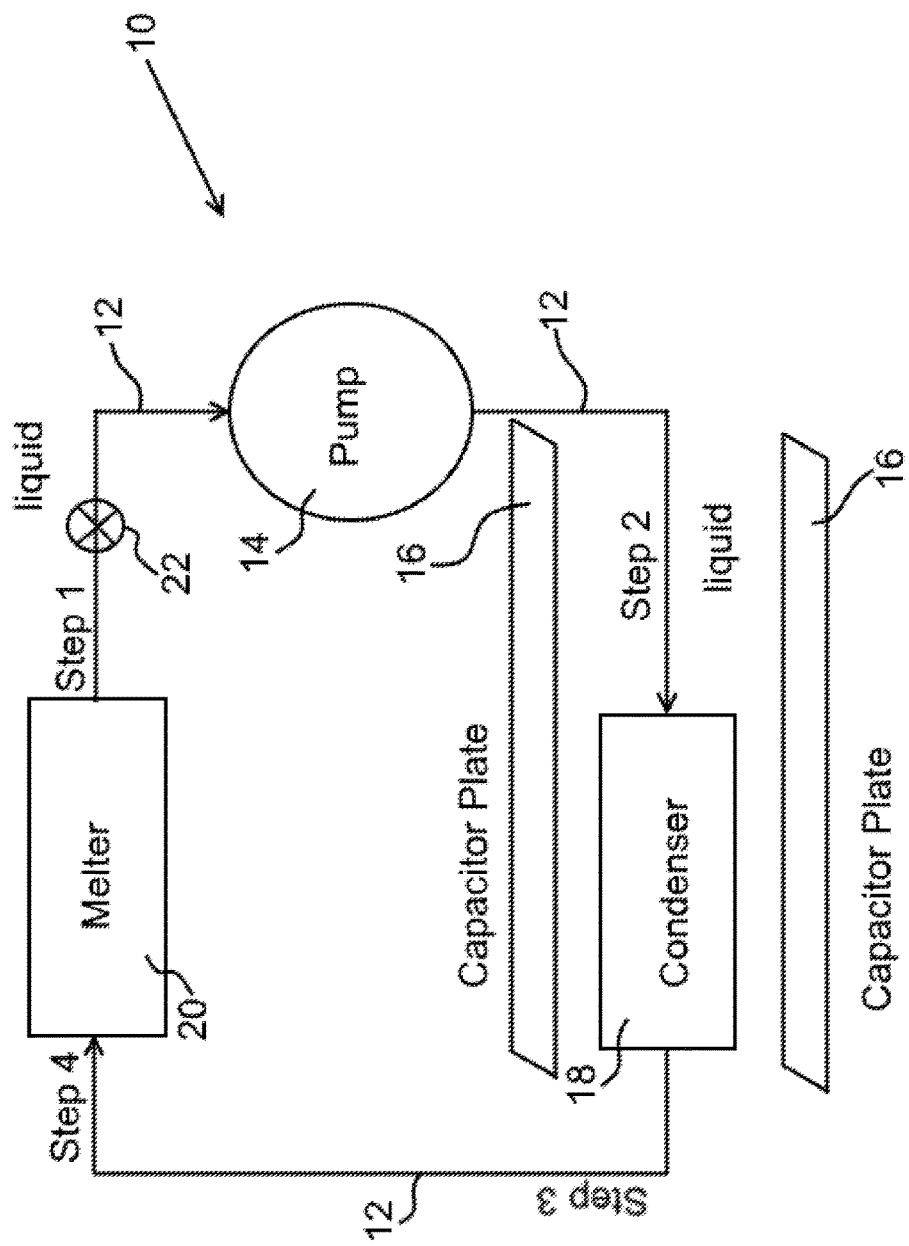
FIG. 2 is a schematic diagram of the system and method, in accordance with features of the present invention.

FIG. 2 is a schematic diagram of the invented system, the system designated as numeral 10. Generally, the system is a closed loop system. However, means for changing or replenishing fluid is envisioned, such as fluid ingress and egress valves 22 suitably positioned throughout the cycle.

Step 1 of the system is defined by a fluid passing through a conduit 12 to a pump 14. The pump is utilized to generate fluid flow at a pressure sufficient to traverse the system at a velocity to assure cooling and heating of the fluid. Generally, pressures greater than ambient are suitable. Pressures from between approximately 15 psi and 1000 psi are preferable.

Downstream from the pump 14, the fluid conduit 12 directs the pressurized fluid to an electrical field in Step 2 of the process. A myriad of means for creating an electrical field are commercially available. FIG. 2 depicts a plurality of capacitor plates 16 flanking the conduit 12. At this point in the system, preferably the conduit 12 is comprised of material which will not attenuate or otherwise stymie the electric field. For example, plastic tubing or other nonferrous material is suitable. The pressure of the fluid is adjusted so as to allow the fluid a sufficient dwell time between the capacitor plates to be acted upon by the electrical field at an electrical field strength sufficient to raise the temperature of the fluid to T2, as described supra. Suitable electrical field has a strength of between approximately $10^3$ volts per meter and approximately $10^{10}$ volts per meter, and preferably between approximately $10^5$ and approximately $10^7$ volts per meter.

Step 3 of the process embodies the use of a heat exchanger 18 such as a condenser to extract heat from the fluid so as to decrease the temperature of the fluid from T2 to T3. During this phase, the capacitor continues to impart an electric field force on the cooling fluid. This electric field application provides the work to cause heat to flow from a colder to a warmer area in the system loop. At this point, the fluid begins a phase change from substantially entirely liquid to partially solid (e.g. slush consistency). The fluid is at a temperature T3 lower than T2.

The liquid-solid mixture (slush) passes out of the condenser 18 and through an egress conduit 12. Between Step 3 and 4, the fluid resides in a region of the system where no further heat ejection is occurring, and no electric field is applied. As such, upon reaching Step 4 of the system, the fluid is at a temperature T4 that is the lowest of all regions within the system.

As the now coldest fluid traverses the closed loop conduit 12 back to its starting point, it contacts another heat exchange unit 20 (e.g. a melter) wherein heat is introduced back to the fluid. Upon traversing this second exchange unit, the fluid raises to its initial temperature T1.

Running Substances
Detail

Properties that a make a fluid suitable for our method and device are: large latent heat of fusion i.e., no less than 10 kJ/kg, melting temperature in the vicinity of room temperature, (i.e., 10° C. to 40° C.), large electric dipole moments, (i.e., no less than about 0:1 Debyes.)

So-called phase change materials (PCMs) satisfy these properties. Such materials utilize their latent heat of fusion to absorb, store, and release thermal energy during phase conversions between solid and liquid phases. The large latent heat of fusion of PCMs can be used as a heat source or as a heat sink.

Several polar or ionic substances, inorganic or organic, that changes from solid to liquid can be used as a PCM. Examples of polar PCMs include, but are not limited to, alcohols, glycerols, carboxylic acids, clathrates, hydrated clathrates, ethylene glycol, polyethylene glycol. Examples of ionic PCMs include, but are not limited to, hydrated salts, 1-akyl-3-methylimidazolium bromide, ([Cn MIM]Br, n=10; 16), 1-akyl-2,3-dimethylimidazolium bromide ([Cn MMIM] Br, n=4; 10; 16), 1-butyl-3 methylimidazolium chloride ([C4 MIM]Cl), 1-butyl-2,3-dimethylimidazolium chloride, and ethnolamine tetrauoroborates. A reference of polar and ionic PCMs includes A. Sharma et al., Renewable and Sustainable Energy Reviews 13, 318-345 (2009), incorporated herein by reference.

Suitable running substances (RS) include polar and ionic fluids with latent heat values of at least about 50 kJ kg−1, and preferably between about 100 and about 400 kJ kg$^{-1}$. Exemplary polar fluids include, but are not limited to, water, alcohols, carboxylic acids, salt hydrates, and combinations thereof. For example, water can be used neat, or else diluted with another polar (e.g. miscible) substance. The inventors estimate that the temperature change of polar liquids, such as water, will be up to approximately 80° K, which is an order of magnitude larger than the solid state ferroelectric refrigerant $BaTiO_3$.

Suitable ionic substances include those with a conductivity of at least about $10^{-3}$ siemens per meter (S/m), and preferably between about $10^{-3}$ and about $10^2$ S/m. Exemplary ionic substances include sodium sulphate ($NaClNa_2SO_4.10H_2O$), manganese (II) nitrate hexahydrate ($Mn(NO_3)_2.6H_2O$), and combinations thereof.

Electric Field Generation

In one embodiment, the system provides an electric field by locating electric charges in proximity to the fluid whose temperature is to undergo a change. In one embodiment, two conductors are charged and placed in proximity to the fluid. In one embodiment, the electric fields are static, and so the charged conductors do not move. In another embodiment, the electric fields are dynamic, as the conductors move in relation to one another, as well as in respect to the liquid to be heated or cooled. In one such dynamic embodiment, the conductors are rotating around the fluid.

In one embodiment, the distance between the one or more conductors and the fluid is minimized, as the field weakens as the distance increases. Further, the container holding the liquid comprises a material that is thin and transparent to the electric field.

In order to prevent arcing, the charged conductor generating the electric field and the liquid is maintained in a non-conductive environment. In one embodiment, the charged conductor and the liquid are placed in a vacuum or near vacuum. In another embodiment, the environment provides an insulating material around the charged conductor.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for cooling fluid, the method comprising:
   a) supplying an electrically conductive fluid, wherein the electrically conductive fluid is at a first temperature T1;
   b) subjecting the electrically conductive fluid to an electric field for a time and at a voltage sufficient to raise the temperature of the electrically conductive fluid to a second temperature from T1 to T2;
   c) reducing the temperature of the electrically conductive fluid to a third temperature from T2 to T3;
   d) removing the electrically conductive fluid from the electric field under adiabatic conditions to cause the fluid to decrease to a fourth temperature from T3 to T4; and
   e) placing a heat load on the electrically conductive fluid to increase the temperature of the electrically conductive fluid to the first temperature from T4 to T1.

2. The method as recited in claim 1 wherein the electrically conductive fluid is supplied as a liquid selected from the group consisting of polar liquids, ionic liquids, and combinations thereof.

3. The method as recited in claim 1 wherein T2>T3>T1>T4.

4. The method as recited in claim 1 wherein the step of reducing the temperature of the electrically conductive fluid to a third temperature comprises contacting the electrically conductive fluid with a heat exchanger.

5. The method as recited in claim 1 wherein the electrically conductive fluid at T4 defines slush.

6. A system for cooling fluid, the system comprising:
   a) a closed loop adapted to receive an electrically conductive fluid, wherein the electrically conductive fluid is at a first temperature, T1;
   b) an electric field in a close spatial relationship to a first region of the closed loop, said electric field subjecting the electrically conductive fluid to a current so as to raise the temperature of the electrically conductive fluid to a second temperature T2;
   c) a heat exchanger in thermal contact to a second region of the closed loop, wherein said second region is contiguous with the first region, said heat exchanger maintained at a temperature to cause the electrically conductive fluid to decrease in temperature from T2 to T3;
   d) a third region of the closed loop, wherein said third region is remote from the electric field to facilitate removal of the electrically conductive fluid from the electric field under adiabatic conditions, to cause the temperature of the electrically conductive fluid to increase from T3 to a fourth temperature T4; and
   e) a heat load thermally contacting a fourth region of the closed loop, wherein said fourth region is contiguous with the third region, said heat load adapted to increase the temperature of the electrically conductive fluid from T4 to the first temperature T1.

7. The system as recited in claim 6 wherein the closed loop is a continuous conduit comprised of an electrically transparent material selected from the group consisting of nonferrous metal, glass, plastic, fiberglass, and combinations thereof.

8. The system as recited in claim 6 wherein the electrical field has a strength of between approximately $10^3$ volts per meter and approximately $10^{10}$ volts per meter.

9. The system as recited in claim 6 wherein the heat load is a substrate in thermal communication with the fourth region, wherein the substrate is maintained at a temperature above the fourth temperature.

* * * * *